UNITED STATES PATENT OFFICE.

FREDERICK W. SPERR, JR., OF OAKMONT, AND MARC DARRIN, OF WILKINSBURG, PENNSYLVANIA, ASSIGNORS TO H. KOPPERS COMPANY, OF PITTSBURGH, PENNSYLVANIA, A CORPORATION OF PENNSYLVANIA.

PAINT OR VARNISH AND METHOD OF MAKING THE SAME.

1,292,908. Specification of Letters Patent. Patented Jan. 28, 1919.

No Drawing. Original application filed August 10, 1917, Serial No. 185,437. Divided and this application filed November 5, 1917. Serial No. 200,360.

*To all whom it may concern:*

Be it known that we, FREDERICK W. SPERR, Jr., and MARC DARRIN, both citizens of the United States, and residents of Oakmont and Wilkinsburg, respectively, both in the county of Allegheny and State of Pennsylvania, have invented a new and useful Paint or Varnish and Method of Making the Same, of which the following is a full, clear, and exact description.

This invention relates to a new composition of matter having bituminous pitch as one of its principal constituents and suitable for use as a paint or varnish, and also to a novel method of preparing such composition.

This application is a division of our copending application Serial No. 185,437, filed August 10, 1917.

This composition overcomes a number of objections that have hitherto applied to the use of bituminous pitches in paints or varnishes. One of the principal difficulties is that of holding the pitch completely in solution in the solvent. Usually there is a strong tendency, especially in the case of pitches high in free carbon, for part of the pitch to precipitate out when the mixture is allowed to stand. Coal tar pitch is an example of a bituminous pitch that is often used in paints and varnishes. The solvents ordinarily employed to hold this in solution are the coal tar creosote oils; but these are acidic in nature, slow drying, non-resistant chemically, and but poorly resistant to weathering. These qualities are due to the fact that coal tar creosote oils are composed to a large extent of cresols and other compounds, closely related chemically to carbolic acid. Such compounds are not only easily saponified by alkalis, but are also soluble in water to an appreciable extent. Thus, the oil is gradually leached out of the paint film, leaving a brittle, crumbling layer, which is neither protective nor ornamental.

We have found that the employment of a compound of the coumarone-indene group in combination with a suitable solvent, greatly facilitates holding the pitch in solution, and the mixture—when properly made—is of neutral character and possesses good drying properties and has excellent resistance to weathering and chemical action.

By use of compounds of the coumarone-indene group in combination with a suitable solvent we have also found it possible to hold in a homogeneous solution, water gas tar pitches, as well as coal tar pitches. Heretofore, difficulty has been encountered in using water gas tar pitches, for paint or varnish purposes, due to the difficulty of holding same in solution, without the addition of solvents detrimental to the protecting qualities of the paint.

The method that we have found best adapted to making composition of this character consists in heating a quantity of the pitch to approximately 160° C., at which temperature it is very fluid, allowing the pitch to cool to a temperature of 140° C., or thereabout, and then adding a suitable volatile solvent in which is already dissolved, the coumarone-indene compounds.

As a specific example we obtained an excellent paint by use of the following proportions:—seven hundred pounds medium grade water gas tar pitch, and fifty-five gallons solvent naphtha, containing approximately forty per cent. coumarone-indene bodies by weight.

The compounds, such as coumarone $C_8H_6O$, and indene $C_9H_8$, may be either added directly as such, or they may be first polymerized to products such as paracoumarone $(C_8H_6O)_x$, paraindene $(C_9H_8)_x$, and related substances. The use of these polymerization compounds is of special advantage in producing hard resistant coatings. For certain grades of paints it is advantageous to vary the composition of the paint as indicated by the above formula. Likewise solvent naphtha can be employed containing different percentages of coumarone-indene bodies than that indicated.

In some cases the process of polymerization may be advantageously combined with the solution of the pitch, or else it may be effected to the desired extent after the solution has been accomplished. For instance, we may take solvents containing coumarone or indene, and mix them with pitch heated to approximately 160° C., and polymerize the coumarone or indene in the mixture by treatment with steam or air, holding the solvent by means of a reflux condenser. Or we may effect the polymerization within the mixture by means of a suitable catalyzer, such as aluminum chlorid.

Therefore, in the claims which define the process of making the composition, we do not intend, unless so specifically stated in the claims, to limit the claims to any particular sequence in the occurrence of the step of polymerizing the compound of the coumarone-indene group, because as above pointed out, the step of polymerizing these compounds may occur previous to, simultaneous with, or subsequent to the step of mixing the bituminous pitch and the solvent containing these compounds.

Other materials such as turpentine, linseed oil, chinawood oil, Venetian red, red lead, zinc oleate, manganese resinate, barium sulfate, etc., may be mixed with the herein described composition for use as thinners, driers, fillers, etc., without affecting the intent and purpose of this invention.

We do not limit ourselves to the particular proportions above stated, as these may be varied to a considerable extent within the scope of the appended claims.

We claim:

1. A paint or varnish comprising a water gas tar pitch, a volatile solvent and compounds of the coumarone-indene group.

2. A paint or varnish comprising a water gas tar pitch, solvent naphtha, and compounds of the coumarone-indene group.

3. A paint or varnish comprising a water gas tar pitch, and a volatile solvent and polymerization products of the coumarone-indene group.

4. A paint or varnish comprising a water gas tar pitch, solvent naphtha, and polymerization products of the coumarone-indene group.

5. The process of making a composition suitable for use as a paint or varnish consisting in heating a water gas tar and mixing therewith a solvent containing compounds of the coumarone-indene group and polymerizing these compounds.

6. The process of making a composition suitable for use as a paint or varnish consisting of heating a water gas tar pitch and solvent naphtha containing compounds of the coumarone-indene group and polymerizing these compounds.

7. The process of making a composition suitable for use as a paint or varnish consisting in heating a water gas tar and mixing therewith a solvent containing compounds of the coumarone-indene group and polymerizing these compounds simultaneously.

8. The process of making a composition suitable for use as a paint or varnish consisting of heating a water gas tar pitch and solvent naphtha containing compounds of the coumarone-indene group and polymerizing these compounds simultaneously.

9. A paint or varnish comprising a gas tar pitch, a volatile solvent and compounds of the coumarone-indene group.

10. A paint or varnish comprising a gas tar pitch, solvent naphtha, and compounds of the coumarone-indene group.

11. A paint or varnish comprising a gas tar pitch, and a volatile solvent and polymerization products of the coumarone-indene group.

12. A paint or varnish comprising a gas tar pitch, solvent naphtha, and polymerization products of the coumarone-indene group.

In testimony whereof, we have hereunto set our hands.

FREDERICK W. SPERR, Jr.
MARC DARRIN.